US012020061B2

(12) United States Patent
Fatahi et al.

(10) Patent No.: US 12,020,061 B2
(45) Date of Patent: Jun. 25, 2024

(54) SYSTEM AND METHOD FOR META-TRANSACTIONAL INTEROPERABILITY OF DECENTRALIZED COMPUTING NETWORKS

(71) Applicants: Reza Fatahi, Encino, CA (US); Dane Scarborough, Culver City, CA (US)

(72) Inventors: Reza Fatahi, Encino, CA (US); Dane Scarborough, Culver City, CA (US)

( * ) Notice: Subject to any disclaimer, the term of this patent is extended or adjusted under 35 U.S.C. 154(b) by 0 days.

(21) Appl. No.: 17/713,073

(22) Filed: Apr. 4, 2022

(65) Prior Publication Data

US 2023/0004423 A1 Jan. 5, 2023

Related U.S. Application Data

(60) Provisional application No. 63/171,578, filed on Apr. 7, 2021.

(51) Int. Cl.
*G06F 9/46* (2006.01)
*G06F 21/60* (2013.01)
*G06Q 20/38* (2012.01)

(52) U.S. Cl.
CPC ............ *G06F 9/466* (2013.01); *G06F 21/602* (2013.01); *G06Q 20/3821* (2013.01)

(58) Field of Classification Search
CPC ................................................ G06Q 20/3821
USPC ...................................................... 707/703
See application file for complete search history.

(56) References Cited

U.S. PATENT DOCUMENTS

| 2017/0048235 A1* | 2/2017 | Lohe | G06F 12/1408 |
| 2018/0144156 A1* | 5/2018 | Marin | H04L 9/0637 |
| 2019/0325407 A1* | 10/2019 | Zhou | G06Q 20/3274 |
| 2019/0333054 A1* | 10/2019 | Cona | G06Q 20/383 |
| 2019/0361917 A1* | 11/2019 | Tran | H04W 12/108 |

(Continued)

*Primary Examiner* — Cam Linh T Nguyen (57) ABSTRACT

A system and its methods are described for implementing meta-transactional interactions across one or more decentralized computing networks ("blockchains") with a managed ("custodial") wallet, satisfying an important need of lowering the barrier of entry for interacting with smart contracts across multiple blockchain networks. First, the method of encoding and storing a transactional request created by a user's managed account, representing an intention to broadcast the invocation of a specific function of a specific smart contract on one or more peer nodes of a specific blockchain. Then, calculating a cost for processing the encoded transaction within the specific blockchain via analysis including the value and type of cryptocurrency, complexity of transaction, historical trend of transaction fees, and analyses to eliminate the chance of loss due to insufficient transaction fees. Next, obtaining a payment from the user for the transfer of the amount to successfully process their queued transaction. Then, confirming the payment was received in its correct and sufficient form resulting in a transfer of cryptocurrency from a reserve to the user's managed account. Subsequently, determining the transfer is completed and a sufficient balance exists for the execution of the queued transaction. Finally, dequeuing and executing the stored transaction on a specific blockchain by the system on behalf of the managed account, where transaction fees are paid by the managed account and unspent fees are accrued in the balances of the managed wallet.

7 Claims, 8 Drawing Sheets

(56) References Cited

U.S. PATENT DOCUMENTS

| | | | |
|---|---|---|---|
| 2020/0160328 A1* | 5/2020 | Yan | G06Q 20/3829 |
| 2020/0160330 A1* | 5/2020 | Yan | H04L 9/0861 |
| 2020/0175590 A1* | 6/2020 | Huo | H04L 9/50 |
| 2020/0387891 A1* | 12/2020 | Paschini | G06Q 20/3672 |
| 2021/0012278 A1* | 1/2021 | Alon | G06Q 30/018 |
| 2021/0248653 A1* | 8/2021 | McKenzie | G06F 21/44 |

\* cited by examiner

SYSTEM AND METHOD FOR META-TRANSACTIONAL INTEROPERABILITY OF DECENTRALIZED COMPUTING NETWORKS

CROSS-REFERENCE TO RELATED APPLICATIONS

This application is a continuation of provisional application No. 63/171,578 filed on 2021 Apr. 7.

FIELD

Embodiments of the present disclosure relate to a system, method, program, and product for interactions with various smart contracts residing on various blockchains including the exchange of fiat currency to fungible tokens.

BACKGROUND

A blockchain is a decentralized network that ensures records are trusted, via a peer-review consensus mechanism, and that allows transfer of value. Various blockchains enable decentralized computing through programs commonly known as "smart contracts". These systems include Ethereum, forks of the Ethereum project, Solana, Oasis Network, NEAR, and others.

Smart contracts are interfaced to other applications through an encoding of their functions, often known as an application binary interface (ABI). Many smart contracts are developed following standards, such as the non-fungible token (NFT) standard that includes transfer, permissions, and uniqueness features common to all NFTs. However, custom smart contracts may also be developed and include other features such as oracles who communicate to an outside application programming interface (API) via Hypertext Transfer Protocol (HTTP) or similar. Together with the network information of a blockchain and deployment information of a smart contract, the address, viewing immutable historical data of the smart contract including lineage data, such as a token derived data, is available via a "web3" interface. Write operations involving changes to the internal state of a smart contract or token derivative are almost always associated a transaction fee, known as "gas", that is required in the payload of an originating request object.

Historically, the barrier of entry for interacting with smart contracts required knowledge and skill to create and configure a wallet for each respective blockchain, purchase tokens and "seed" the wallet(s), develop and deploy smart contracts, and transmit requests for specific interactions with smart contracts via a web3 interface. It also remains a challenge for lay operators to know about and/or find many of the cryptocurrencies of smaller blockchains where smart contract deployment and interactions are more economically advantageous. Furthermore, the various smart contracts of various blockchains remain segregated and there remains no solution to organize various smart contracts of various blockchains in an interoperable manner.

The present disclosure proposes a solution to lowering the barrier of entry for connecting with various blockchains, including economically advantageous blockchains, for the purposes of decentralized computing and benefitting from the consensus mechanism of blockchain networks.

SUMMARY

Embodiments are related to providing exchange of fiat currencies for cryptocurrencies on an as-needed basis for interactions with various smart contracts on various blockchains. In one embodiment, a managed wallet that includes identification information belonging to one account, selecting a blockchain from the selection of at least one blockchain or deployed smart contract, identifying the wallet address associated with the selected blockchain, constructing a web3 transaction payload based on acquired user input from a simple interface, approving a fiat transfer by merchant service provider API of a calculated amount of a transaction fee, processing the exchange of fiat for native tokens of the selected blockchain, transferring tokens from a reserve to the managed wallet, and transmitting the web3 transaction on behalf of the managed wallet. The difference in purchase amount and transaction fee is accrued by the managed wallet. In some embodiments, the smart contract may include an oracle transmitting an HTTP request for another on-chain transfer and/or transaction on another blockchain different from the on-chain network of the originating smart contract of the oracle.

DESCRIPTION OF THE DRAWINGS

The figures depict, and the detail description describes various non-limiting embodiments for purposes of illustration only. In the drawings.

DETAILED DESCRIPTION OF THE INVENTION

The embodiments listed below are written only to illustrate the applications of this apparatus and method, not to limit the scope. One of skill in the art may recognize alternative embodiments of the structures and methods disclosed herein as viable alternatives that may be employed without departing from the principles of what is disclosed.

Reference will be made in detail to several embodiments, the examples are illustrated as accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Certain terms are used throughout the following description and claims to refer to particular system components. As one skilled in the art will appreciate, different companies may refer to a component and/or method by different names. This document does not intend to distinguish between components and/or methods that differ in name but not in function.

In the following discussion and in the claims, the terms "including" and "comprising" are used in an open-ended fashion, and thus may be interpreted to mean "including, but not limited to . . . ". The availability of many products, alternatives, and/or options of an apparatus are expressed herein as "various".

The present disclosure describes in part the following:

Reserve based exchange: Smart contract interactions and/or transactions are limited by the ability of an operator to: connect to the blockchain of a smart contract, identify the application interface of the smart contract, construct a transaction request, and transmit a token payload for rendering transaction and/or processing fees involved in decentralized computing networks. Token payloads of a transaction require native tokens of the blockchain the transaction and request are intended to target, this to satisfy transaction fees commonly known as "gas". Native tokens are available for acquisition from numerous centralized and decentralized exchanges, where fiat currency is converted to a selected native token of a specified or selected blockchain. The barrier to entry of decentralized exchanges is greater than centralized exchanges, requiring foreknowledge of creating and configuring a wallet. For this purpose, many lay (i.e., novice) operators often interact with a centralized exchange wherein a managed wallet is automatically created on their behalf. Coinbase is a popular centralized exchange where tokens can be acquired for a specific set of blockchains. A Coinbase account results in a wallet object with addresses corresponding to the various blockchains they support. The Coinbase wallet is an abstract representation that reduces the barrier of entry by limiting interactions of the operator to the purchase, sales, and transfer of tokens with a single wallet representation and limiting interactions with facets of blockchains, thus, reducing the complexity space of blockchain interactions. Although many of the blockchains (i.e., supported by Coinbase) include many other smart contracts, their features are unavailable. Those interactions require knowledge and skill that is beyond the ability of many lay operators. Furthermore, the purchase of tokens from existing exchanges is not directed by an immediate transactional need to satisfy gas, instead purchases of blockchain tokens are often in bulk for reasons other than to regularly interact with blockchains as a decentralized computing network.

The disclosed reserve-based exchange system offers the tokens and amounts in a flexible manner consisting of: (1) custom reserves with unlimited or limited allotments to managed accounts, (2) bulk purchases for multiple transactions, and (3) in the amount necessary for a single transaction as calculated by the transaction and blockchain type at a given time. The transactions of this system involving a smart contract are comprised of: (1) interactions with a smart contract that is already deployed on a specific blockchain, (2) the deployment of a smart contract, and (3) native token transfers not involving any smart contract.

Meta-transactions: A registration to this system results in the creation of a managed wallet that is an abstraction of multiple unique wallet addresses for each of a selection of various blockchains, such as Ethereum (and Ethereum forks), Solana, NEAR, etc. The managed wallet itself contains a unique identifier associated with an account representing a registered user. The account and wallet data are accessible following authentication with user-specific credentials information. All the transactions of this system are abstracted to a less granular manner by a managed wallet, wherein less skilled operators are presented fewer actions, features, options, etc. and automations, processing, and/or transactions that are handled on their behalf by the system.

Cross-chain support: The system and method of the embodiment provide a solution to connect any smart contract to any other blockchain. The transmission is received by the reserve-based exchange system. The transmission consists of at least one of each a unique identifier and URI specifying at least one API action, a target address can be specified in the smart contract of the oracle or obtained from the blockchain itself. The instruction comprises a meta-transaction consisting of at least one transaction of one of a selection of various smart contracts and/or blockchains. The transaction consists of at least one of a deployment of a smart contract, interaction with a smart contract, interaction with a token of a smart contract, or transfer of a fungible native token of a blockchain. The at least one deployment or interaction of a smart contract can be transmitted to at least one of a selection of blockchains and can be a different blockchain than the native blockchain of the oracle's smart contract. The at least one transfer of a fungible native token of a blockchain can be transmitted to at least one of a selection of blockchains and can be a different blockchain than the native blockchain of the oracle's smart contract. The ownership transfer of a non-fungible token (NFT) results in the transfer of ownership of the original NFT, retaining the original metadata of the token (created date, transaction history, etc.).

Configurable reserve: The default configuration of the reserve-based exchange system consists of at least one of a localized reserve and zero or more wallets of a regional reserve. Each reserve consists of a wallet consisting of wallet addresses for each of a selection of various blockchains. Multiple reserves may be configured for distributing tokens to more than one wallet address and to configure custom wallet addresses as reserves.

Configurable smart contracts: The embodiment of creating, deploying, and interacting with custom smart contracts are described. The custom smart contracts originate from at least one template and accompanying oracle that may be further customized. The intermediate representation of a smart contract is compiled to a smart contract for deployment with a meta-transaction. The standardized smart contract includes at least one of a token type including the NFT standard. For example, custom functions or methods (e.g., encryption, etc.) can be modified.

Software-as-a-Service (SaaS): The reserve-based exchange system comprises an API accessible by HTTP protocol. Configurations exist for deployment of an exact form and function of reserves and smart contracts, exposing a more comprehensive set of features. The user interface/user experience (UI/UX) of this embodiment includes supporting between one and many smart contracts for each of a selection of between one and many blockchains. The UI/UX of smart contract development includes at least one of a wizard, code editor, and graphical editor included in this embodiment. Another distinguishing aspect of this embodiment is team and/or organization management that benefits enterprise settings with rule-based access control (RBAC) or similar.

API appliance: This embodiment consists of a customized on-premises and/or offline deployment of the system including reserve system, supporting variants not covered by traditional SaaS. This embodiment is distinguished from SaaS by its deployment and use, such as headless operations where interactions with the system exist from an interface other than SaaS.

Multiplatform decentralized applications: This embodiment consists of dedicated smart contract interactions and emphasizes UI/UX and/or graphical user interface (GUI) aspects of the interactions with between one and few smart contracts of between one and few blockchains. The UI/UX of these applications are in part defined by a sequence consisting of authentication and features of interaction(s) and/or deployment(s) of at least one smart contract. These applications are available across multiple (mobile, tablet, desktop, embedded, etc.) devices.

The decentralized applications are based upon their role and interactions with one or more smart contracts, in their deployments and/or interactions. The at least one smart contract includes the interface rules that govern the application and its UI/UX. In case of a custom smart contract with oracle, wherein cross-blockchain functionality exists, the decentralized application must consist of at least two smart contracts of at least two blockchains.

Decentralized finance: This embodiment consists of the ability of blockchain to bind a smart contract or token thereof with native tokens of a blockchain. For example, an Ethereum smart contract or NFT can be configured to accept and distribute Ethereum native token, ETH. One can send ETH to the address of the smart contract or NFT. This applies to all smart contracts, regardless of their ability or function to distribute native token(s) they acquired. In cases where at least one function exists for a smart contract or token thereof to distribute the native token(s) they acquired, resulting in conditional distribution, the application of decentralized finance is embodied.

Figure 1:
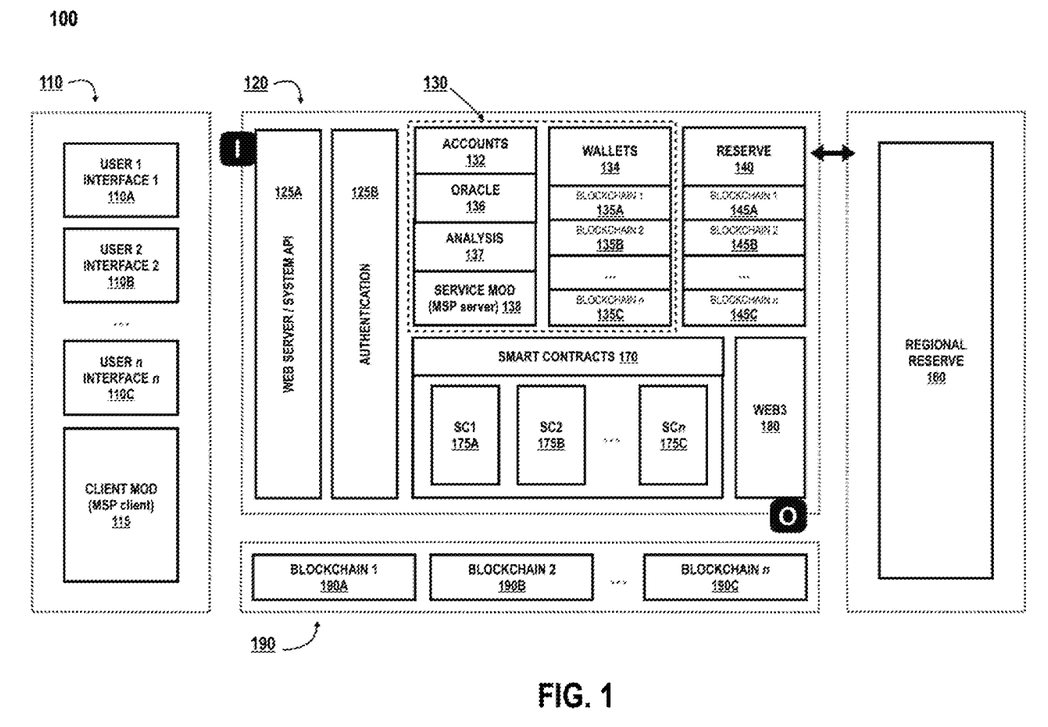
FIG. 1 illustrates various components of the multi-blockchain smart contract management system, in accordance with an embodiment.

FIG. 1 is a block diagram depicting an embodiment of the multi-blockchain smart contract management system (100) containing the following components: (a) outside-facing client components (110), including: (1) devices and/or applications such as a GUI, command line interface (CLI), and API accessible from mobile, tablet, and desktop devices and API accessible from a network (110A, 110B, 110C, etc.); and (2) a client modulator module for access restrictions, for example merchant service provider (MSP) fiat payment gateway to restrict transactions by payment (115); (b) a meta-transactional API gateway (120) that is connected to a web server (125A) and authentication module (125B), wherein: (1) all requests and/or interactions with the API (130) are authenticated, (2) managed account (132) and managed wallet (134) data are accessed, (3) a localized reserve (140) is available for transfers to managed wallets, (4) a smart contract module (170) managing and maintaining supported smart contract implementations across various representations (e.g., Solidity, near-sdk-rs, oasis-core, etc.) of various blockchains (175A, 175B, 175C, etc.), (5) an oracle module (136) for listening to smart contract oracle signals and/or transmissions, (6) an analysis module (137) that performs statistical, artificial intelligence and machine learning (AI/ML), deep learning, etc. analysis for calculating transaction fees and custom smart contract features, for example similarity checking for uniqueness; (7) a server modulator (138) that obtains and/or verifies client modulator (115) data, for example fiat payment data from an MSP; and (8) a web3 module (180) wherein transactions are generated and transmitted; (c) heterogeneous decentralized computing networks (190), various blockchains (190A, 190B, 190C, etc.); and (d) regional reserves (160), consisting of zero or more additional reserve wallets that supply tokens to the localized reserve wallet. Each major component is separated by dotted lines. Within the meta-transactional API gateway, the collection of managed account and processing modules are organized by dashed lines, comprising the meta-transaction API.

In this architectural diagram, the API web server acts as an input (box labeled "I") of request data from the outside-facing client components. The processing of requests is handled by various combinations of the modules with various combinations of assets, for example a specific managed account and a specific smart contract, within a selection thereof. The output of the API (box labeled "O") in the diagram consists of the interaction with the blockchain that occurs via transactions at the web3 module. The labels only demonstrate the flow of data for meta-transactional interactions whereby the user-facing client transmits data to the blockchain. This depiction does not imply the absence of and/or limit the bidirectional communications that exist between the blockchain, meta-transactional API gateway, and/or client components.

Figure 2:
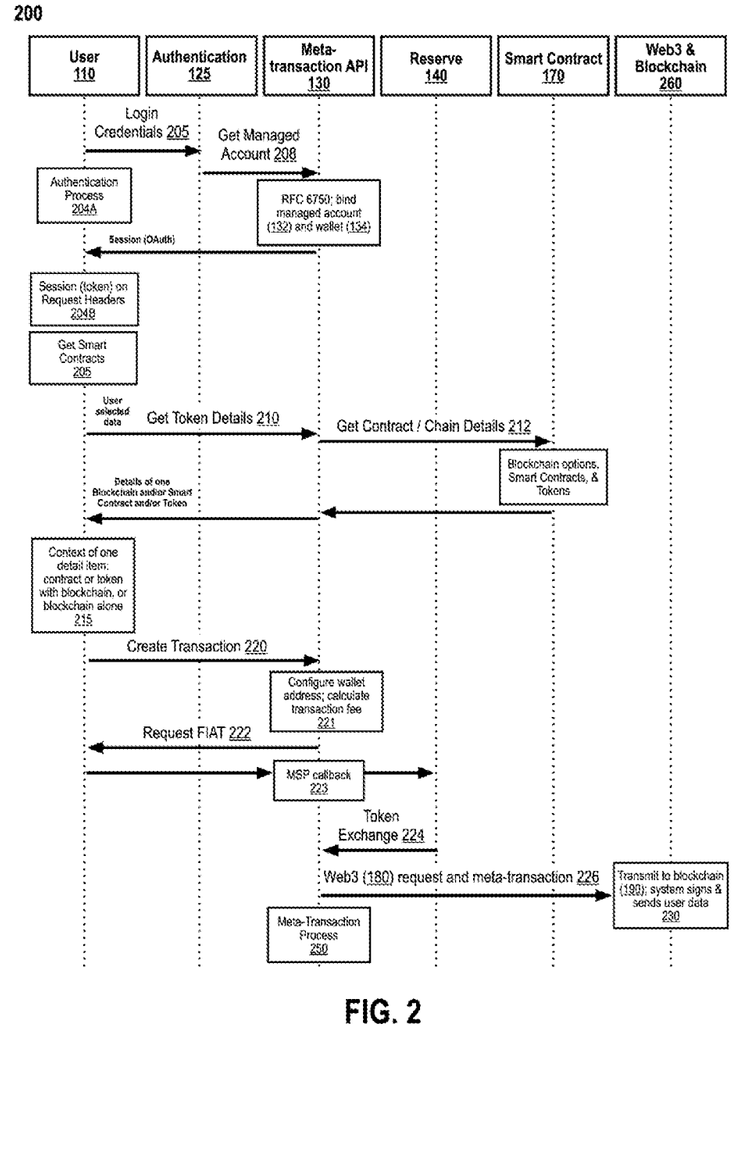
FIG. 2 is a flowchart depicting an example process of a meta-transaction, in accordance with an embodiment.

FIG. 2 is a flowchart depicting an example process of a meta-transaction exchange between a user and the system (or its methods). In general, a user (110) will authenticate with the system by interacting with the authentication (125) and API (130) modules, whereby user-specific credentials (205) are validated and result in the acquisition of the user's managed account data (208) that is bound to a session token under RFC-6750 and the like (i.e., JSON Web Token (JWT), multi-factor authentication, OpenAuth, etc.). These data will include the access identifiers for the user's account (132) and wallet (134) that are bound to a session and/or access token that must be subsequently utilized for authentication in all protected functions and/or features of the API.

Once authenticated (204), all subsequent interactions with API will require a valid session token per RFC-6750 and like mechanisms and/or standards. These interactions are generally the ability to acquire existing token and/or smart contract resources (205, 210) for selection of an interaction. A selected token and/or smart contract (i.e., post-deployment) will have specific blockchain information (212), unless it is not deployed and where a user selects a target blockchain for deployment of the smart contract (not illustrated in FIG. 2).

Based on the interface of the token and/or smart contract, for example ERC-20 on the Ethereum network having its own interface, a selection of actions is available to the user. The user selects a specific action based on the GUI, CLI, API, etc. options of (110) and makes a request to create a transaction (220) that defines a formal interaction between the user and a specific token, smart contract, and/or blockchain.

The time from the start of (220) until the system sends the request via web3 module (180) on behalf of the user to the blockchain defines the "meta-transaction" itself (250). A meta-transaction is a transaction whereby the fees and/or details of a blockchain transaction are handled by a third-party. In this case, the system is the third-party between the user and a blockchain. The purpose and value of the meta-transaction is to avoid potential issues, distractions, and/or barriers between a user's desire to conduct a transaction and their ability, knowledge, and/or skill to effectively carry out that transaction. In the present disclosure, we are presenting a novel meta-transactional mechanism that builds upon the art and involves automation by way of an exchange mechanism, whereby the user's wallet is a managed wallet (134), funds are transferred to the user's wallet by a reserve mechanism (224), and a transaction is carried out on behalf of a user with the details of their managed account and/or wallet (250), whereby a transaction is signed on behalf of the user by the system once the funds are transferred and available for that transaction to succeed.

The details of the meta-transaction are generally the request to create a transaction (220) that occurs within the context of a specific blockchain, token, and/or smart contract. At the minimum, at least the blockchain must be defined to conduct a transaction, whereby such a transaction would be transfer of the native token of a specific blockchain. In general, a transaction will be created in the context of a specific token and/or smart contract, wherein both a specific blockchain and an interface to a specific smart contract will exist. For example, the interface of an ERC-20 (fungible) or ERC-721 (non-fungible) token to transfer a token, consisting of at least one specific function resulting in changes to the internal state of an already deployed smart contract on a specific blockchain. It is the goal, responsibility, and/or scope of the API (130) and client-facing (110) components to restrict the selection of options to the user only to those actions they are allowed to make, otherwise the transaction will fail, and transaction fees will likely be lost.

Therefore, upon a valid selection of options for the interaction of a user with a token and/or smart contract, within the context of a specific blockchain and/or token and/or smart contract (215), a request for a new transaction (220) will result in the identification of the corresponding wallet address (135A, 135B, 135C, etc.) related to the specific blockchain of the context (215). A configuration of the appropriate blockchain wallet and determination of transaction fees is processed by the analysis module (137) based on the complexity of the transaction, selection of blockchain, value of token, etc., comprising 221. The calculated transaction fee amount is requested from the system to the user for payment to satisfy the transaction (222). The process of collecting the transaction fee is handled by a configuration of at least one or more allowable transactions and/or a third-party merchant service provider (MSP; Stripe, Paypal, etc.) consisting of a client component (115) and a server component (138), resulting in a validation of permission and/or payment that determines whether to proceed the transaction request. For example, in fiat transfer with an MSP, the payment of the amount of the calculated transaction fee is obtained by an MSP callback (223), whereby the system proceeds with processing and/or transacting the exchange of fiat for tokens (224).

The exchange amount (of 224) is the calculated transaction fee that was authorized and/or paid (i.e., fiat). The calculated transaction fee amount (the first amount) is different than the actual transaction fee amount (the second amount). In general, it is expected the calculated transaction fee amount (the first amount) will be at least equal to or greater than the actual transaction fee amount (the second amount) to ensure that fees will not be lost to "out-of-gas" and/or "insufficient funds" error(s). The difference between the first amount and second amount, if any, will be accrued in the user's wallet.

Once the exchange is complete (224) and tokens are available in the managed account's selected wallet address, as determined by a balance check by the web3 module (180) or similar, the requested transaction is translated to an actual transaction request object by the web3 module (180). Each blockchain, for example Ethereum, Solana, NEAR, etc., will have their own mechanism(s) and/or standard(s) for structuring and/or generating a transaction request object. For example, the transaction object of Ethereum for transferring a fungible and non-fungible token is not the same as the transaction object of Solana, NEAR, Oasis Network, etc. for transferring a fungible and non-fungible token. The original transaction request (220) consists of a generic data structure representation of the transaction that is cached/stored by the API (130) until the completion of exchange (224), at which time it is translated to a formal transaction request object specific to the blockchain by the web3 module (180) through a selection of target blockchain network (remote procedural calls (RPC), Websocket, etc.) and domain specific language (DSL) formatting, building, and/or compiling of the generic transaction request to a formal web3 transaction request object that is then dispatched to its target blockchain (226).

The user's managed wallet address (135A, 135B, 135C, etc.) is managed by the system, a custodial wallet, and the system can sign and dispatch the request on behalf of the managed account (i.e., user). The completion of this process (230) results in a change to the internal state of a specific smart contract of a specific blockchain, wherein such changes and/or transactions are publicly viewable and/or verifiable via the explorer of the specific blockchain, denoting the end of a single meta-transaction (250). Therefore, the meta-transaction in the example is bound to the role of the system as a reserve-based exchange, whereby an exchange occurs as a fractional amount of a bulk purchase for the sole objective to fulfill the necessary charges involved in a specific transaction (i.e., transaction fee, gas, etc.) from a selected context by the user. However, this example does not limit the ability of other exchange mechanisms including custom reserves and bulk purchases for multiple or many transactions.

Figure 3:
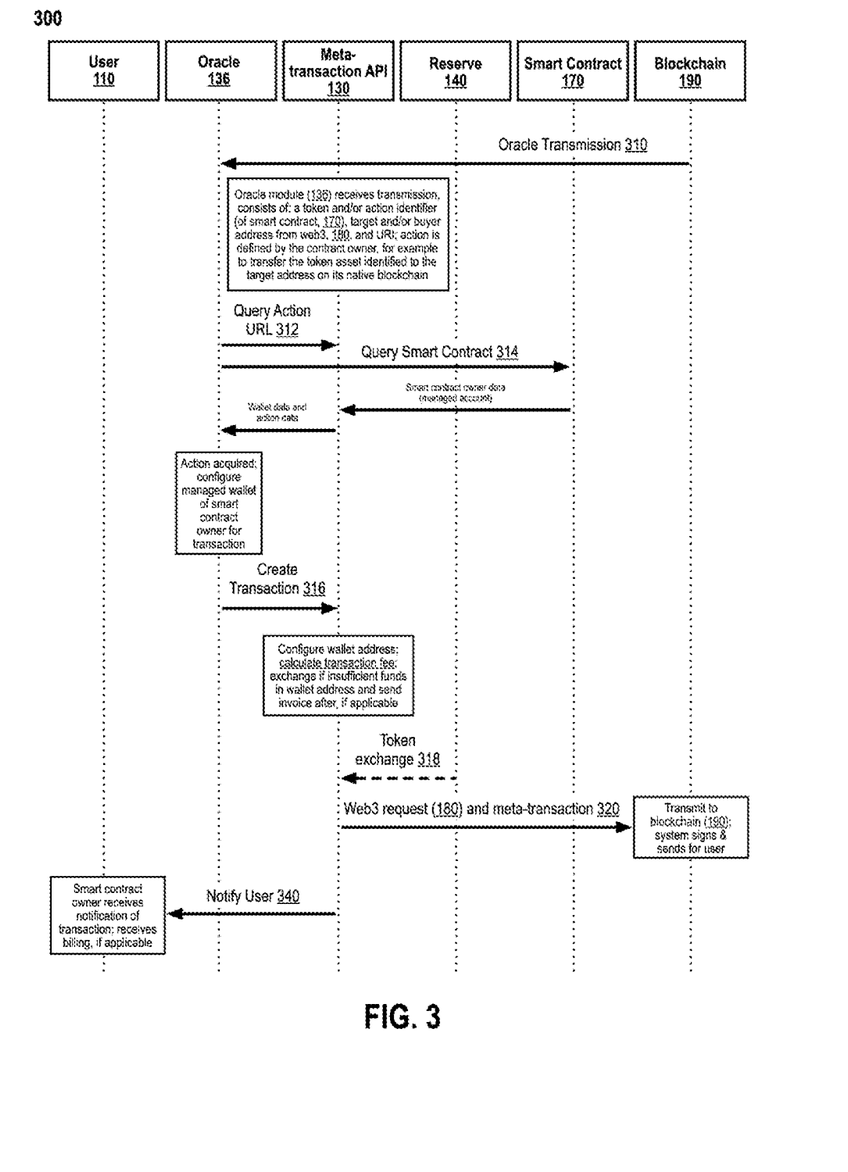
FIG. 3 is a flowchart depicting an example process of an oracle initiated cross-blockchain transaction, in accordance with an embodiment.

FIG. 3 is a flowchart depicting a cross-blockchain transaction initiated by an oracle on a first smart contract on a first blockchain. A preceding event on the first smart contract, based on an independent interaction of a user with the first contract, causes an oracle transmission (310). For example, an atomic swap consisting of a condition for a user to send a specified amount of a specified first token to the first smart contract, initiating a transaction fulfilling the essence of a bargain, consisting of a transfer of a second token from a second smart contract owned by the owner of the first smart contract, and where the second contract is under a lock preventing other transactions, ensuring the success of the swap, via the system's management of the owner's managed account.

The oracle consists of a first action defined by a first unique identifier and first URI that targets a pre-defined, pre-configured, and/or pre-implemented aspect of the API to process an intended result. The transmission is received by an oracle module (136) that utilizes the first unique identifier, first uniform resource identifier (URI), and the identification of an address via a first web3 (180) query of the first smart contract, comprising a query for a first action (312) that identifies a smart contract and/or token for transaction (314) including its blockchain and ownership data, consisting of a managed account and managed wallet. A modification of the meta-transaction exists whereby a token exchange is invoiced (318) and where the owner (i.e., managed account) is notified of the oracle initiated cross-blockchain transaction.

There currently is no mechanism for cross-blockchain transfers of original tokens. The mechanism in use, called a "bridge", creates a new representation of an original token on a different blockchain. The new representation has a different creation date, which is severely detrimental in many use cases such as legal, business, etc. Our solution results in the transfer of an original token, for example by transferring the ownership of a token to a purchaser. The purchaser's address is obtained by the oracle (i.e., string to oracle to address in web3) or may be mapped to the appropriate destination blockchain by the system's managed account and managed wallet methods.

The cross-blockchain interactions and/or transactions resulting from the oracle system of the present disclosure can also be represented as a generic form of cross-blockchain smart contract interactions. The distinguishing aspect of the present disclosure is the ability to expand existing cross-blockchain interactions on layer 1 and layer 2 blockchains, the methods thereof resulting in alternate and expanded operations of existing bridges. For example, the embodiment can be used to create alternate representations of an original asset, resulting from the rules encoded within a smart contract, on multiple blockchains for activities including leasing or borrowing.

Figure 4:
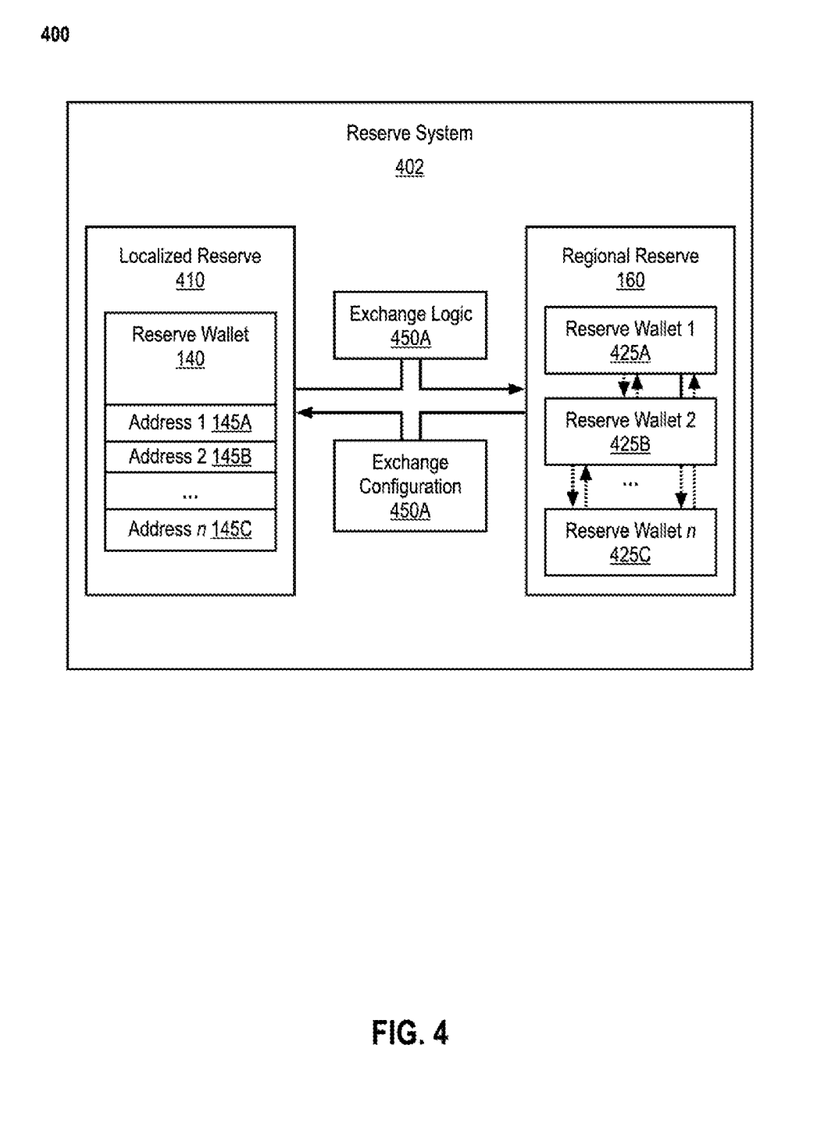
FIG. 4 is a block diagram illustrating a connection of reserves comprising a reserve system, in accordance with an embodiment.

FIG. 4 is a block diagram of the reserve of the present disclosure, illustrating a reserve system comprising one localized reserve (410) with one wallet (140) consisting of unique addresses for each of a selection of blockchains (145A, 145B, 145C, etc.) and one regional reserve (160) comprising zero or more wallets (425A, 425B, 425C, etc.) each consisting of unique addresses for each of a selection of blockchains. A configurable logic controller (450; 450A and 450B) defines the rules for exchanges within wallets of a regional reserve.

Figure 5:
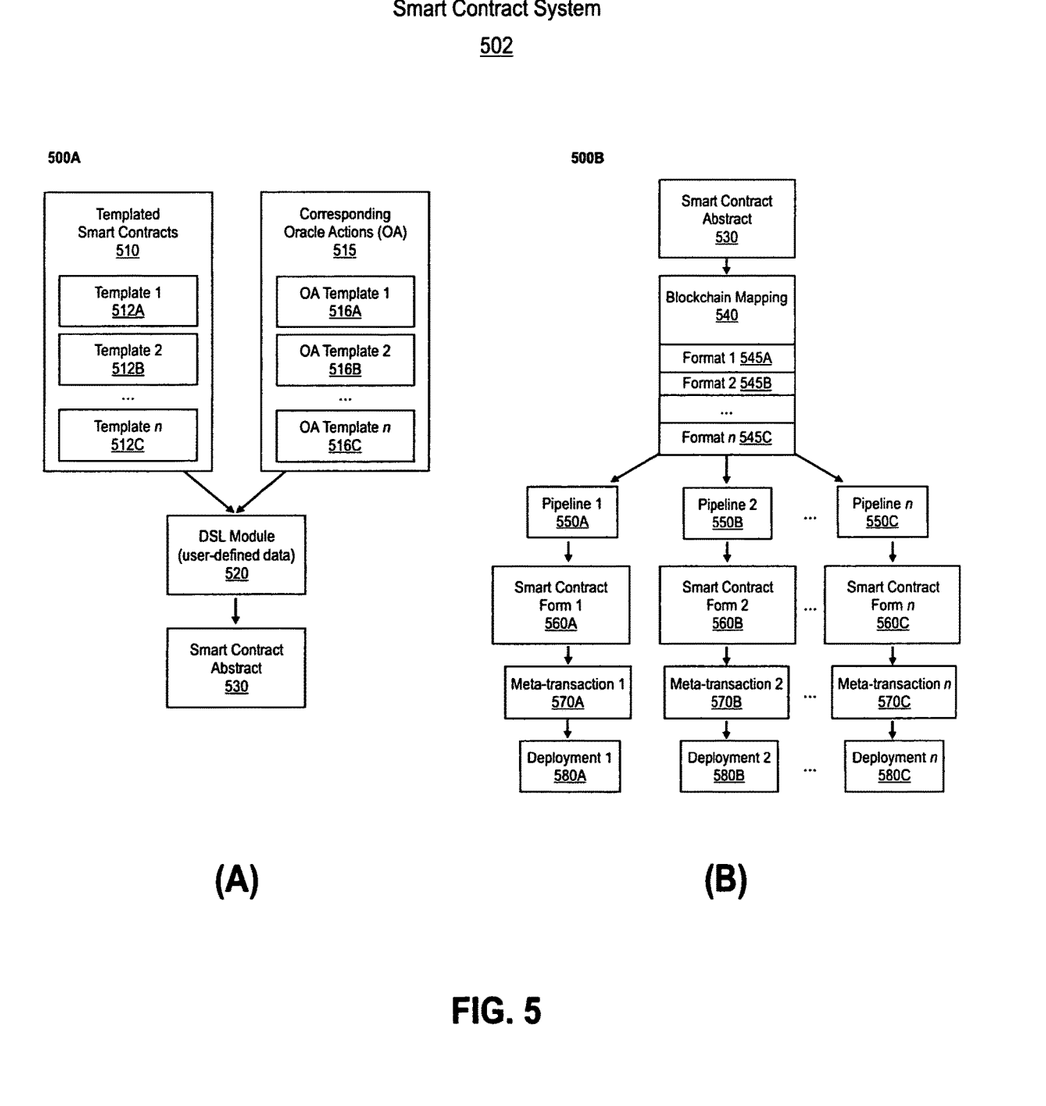
FIG. 5A is a block diagram illustrating an example of generating an intermediate representation and/or abstract representation of a smart contract based on user input via a DSL mechanism, in accordance with an embodiment.
FIG. 5B is a block diagram illustrating an example of an intermediate representation and/or abstract representation of a smart contract based on user input via a DSL mechanism compiled and deployed as a customized smart contracts for various distributed computing networks, in accordance with an embodiment.

FIG. 5A is a block diagram illustrating an example process of a user (110) generating, compiling, and deploying custom smart contracts to various decentralized computing networks. The smart contract system begins by the selection of a templated smart contracts (510) comprised of smart contract templates (512A, 512B, 512C, etc.) from standardized and non-standardized smart contract forms as an abstraction consisting of data structures that define function names, function argument types, function argument names, and return type(s) return name(s). The types supported include signed integers, unsigned integers, address, boolean, string, and bytes. For example, the selection of a NFT smart contract as a standardized smart contract and an escrow smart contract as a non-standardized smart contract type. The permissions for interfaces include at least one of ownership, allowable by assignment, and public for the interfaces of a smart contract other than those restricted to ownership for security purposes.

The optional selection of an oracle (515), whereby a corresponding oracle of a selected template (516A, 516B, 516C, etc.) includes a pre-configured URI and inputs for at least one of a unique identifier of a NFT for transfer and one function invocation of a smart contract owned by the user (110) and a condition, for example sale price of a selected NFT. The user input data defines the invocation of a function of a target smart contract and/or token, for example the transfer of at least one of: the transfer of ownership of a smart contract, the transfer of ownership of an NFT, and/or the transfer of fungible tokens. Additional configurations for the customization of a smart contract exists from textual and/or graphical DSL editors (520) that comprise the final form of a first abstract custom contract (530) that is available for deployment. The configurations are governed by the creation of functions, limited by the types of inputs and return arguments, and built-in features, for example encryption, decryption, hashing, and storage (IPFS, local, private, etc.).

FIG. 5B is a continuation of FIG. 5A, a block diagram, illustrating the compilation and deployment of a user-defined intermediate and/or abstract representation of a custom smart contract whereby the user (110) selects a blockchain from a list of blockchains (540) each with a corresponding map to generate a formal smart contract (545A, 545B, 545C, etc.). A build and/or compilation pipeline (550A, 550B, 550C, etc.), relative to at least a first selection of a deployment blockchain, results in generating the smart contract (560A, 560B, 560C, etc.) and configuring the user's managed wallet for at least one meta-transaction (570A, 570B, 570C, etc.) that results in the deployment of the at least one smart contract to its corresponding blockchain (580A, 580B, 580C, etc.).

The underlying assets that comprise the amount and type of the intended native- or cross-blockchain transfer are locked by the system to ensure their availability for a successful oracle transaction and may be unlocked by destroying the activity of the first deployed smart contract and first deployed oracle. Therefore, the assets eligible for transfer must be owned by the managed wallet of the system.

Figure 6:
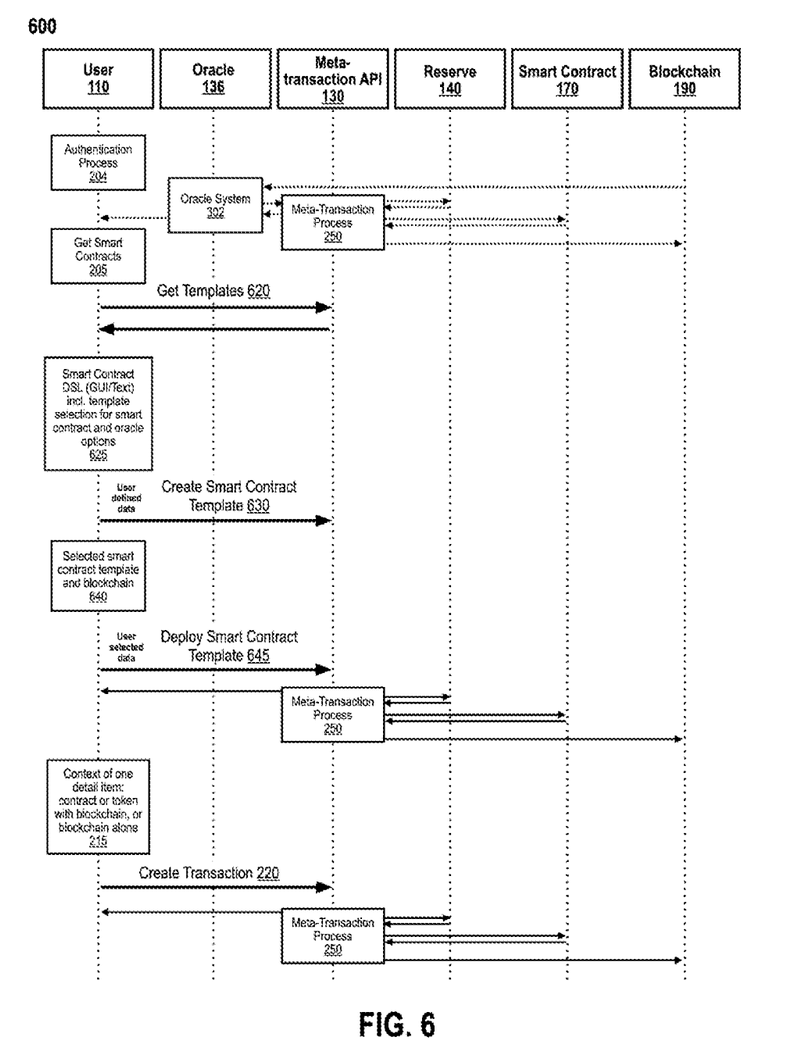
FIG. 6 is a flowchart depicting, an example Software-as-a-Service and/or API implementation, in accordance with an embodiment.

FIG. 6 is a flowchart of an example SaaS and/or API deployment. The enhanced set of features relating to custom smart contract management (620), creation (630), and deployment (645) are made available to users with team and/or organization management aspects for enterprise operations. For example, a human resource department of an organization may create and deploy one or more custom smart contracts for bounties that conditionally reward referrals for job positions at their organization. The distinguishing feature of this embodiment is a wide or full range of features and/or selections for between one and many interactions on between one and many smart contracts.

Figure 7:
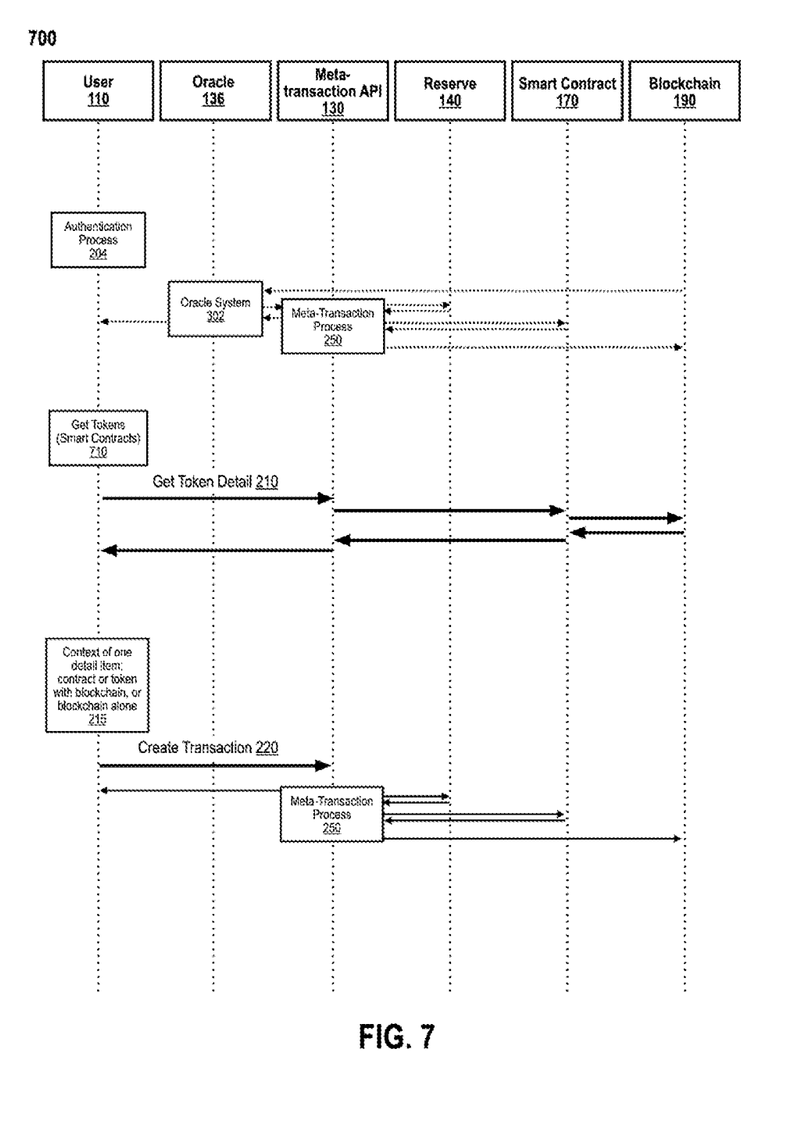
FIG. 7 is a flowchart depicting an example decentralized application (dApp) implementation, in accordance with an embodiment.

FIG. 7 is a flowchart of an example decentralized application (dApp), whereby a narrowly scoped number of features and/or smart contracts (710) are made available for interaction. For example, a marketplace whereby a user may place their assets available for sale. The distinguishing aspect of this embodiment is the narrow scope of features, more limited selections made available to a user (110), and the deployment in multiplatform format for interaction with mobile, tablet, desktop, and/or embedded devices. In the case of embedded devices and APIs, decentralized applications may be initiated autonomously by sensoral, temporal, and/or computational thresholds, determinations, and/or conditions, otherwise to be available for network (i.e., headless) operations. Multiplatform GUI dApps display only the necessary features and/or selections for between one and few interactions on between one and few smart contracts.

Figure 8:
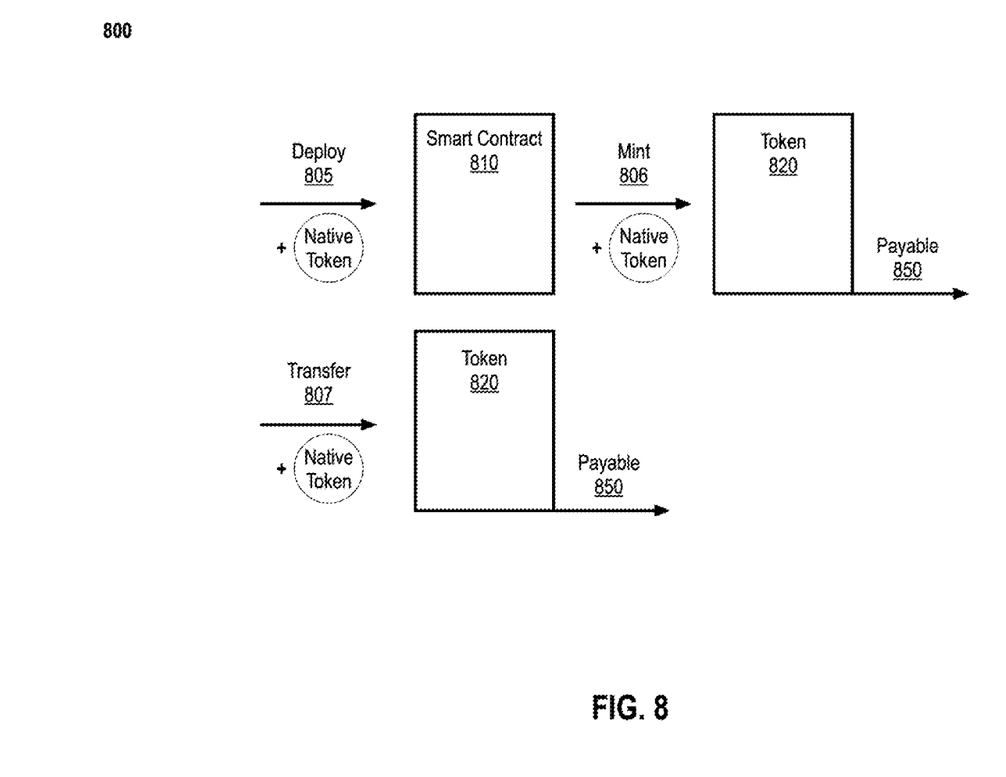
FIG. 8 is a block diagram illustrating an example of decentralized finance with smart contracts, in accordance with an embodiment.

FIG. 8 is a block diagram illustrating decentralized finance aspects of the present disclosure. Native tokens of a blockchain are bound (805) to a smart contract at deployment (810) and/or native tokens of a blockchain are bound (806) to a smart contract generating a token (820), minting (e.g., creating an NFT), and/or native tokens of a blockchain are bound (807) to a token (e.g., NFT) via direct transfer. The interface of a token and/or smart contract (850) allows the bound native token to be transferred to a destination under a transaction that includes permission (e.g., ownership, allowable, etc.). With this mechanism, native- and cross-blockchain interactions are represented as embodiments of the present disclosure as in the use cases above with meta-transactions and oracle initiated meta-transactions, respectively. In this embodiment, the exchange also includes bulk exchange of fiat currencies for cryptocurrencies (i.e., native tokens) for binding to a smart contract and/or token on an as-needed basis to meet requirements of a desired transaction and outcome.

What is claimed is:

1. A multi-blockchain smart contract management system for enabling transactions across one or more blockchains, each of the blockchains having a reserve of a selection of at least one reserve each with a unique identifier and at least one address corresponding to at least one blockchain, wherein an exchange consists of a collection of various tokens of various blockchains associated therewith, the multi-blockchain smart contract management system comprising: (1) one or more processors; (2) one or more memories; (3) one or more computer-readable hardware storage devices, the one or more computer-readable hardware storage devices containing program code executable by the one or more processors via the one or more memories to implement a method for a meta-transactional exchange, the method comprising: (a) authenticating, by the meta-transactional exchange, an access request by a first user to the meta-transactional exchange, comprising the steps of: (1) receiving, by the meta-transactional exchange from the first user, an authentication request including first user credential information associated with the first user; (2) determining, by the meta-transactional exchange, that the first user is authorized to access the meta-transactional exchange based at least in part on the first user credential information; (3) obtaining, by the meta-transactional exchange, a first wallet associated with the first user; (4) obtaining, by the meta-transactional exchange, at least a first smart contract associated with the first user; (5) generating, by the meta-transactional exchange, an authentication token granting the first user access to the meta-transactional exchange application programming interface (API); (b) receiving, by the meta-transactional exchange from the first user, a first transaction request from the selection of at least one function of at least a first smart contract, comprising of: (1) determining, by the first identifier of the first smart contract, a first blockchain associated with a first native token; (2) determining, by the meta-transactional exchange, a first wallet address of the first wallet based on the selection of the first blockchain; (3) processing, by the meta-transactional exchange, a first encoding of the first transaction request that is associated with the first user and stored in a processing queue; (4) obtaining, by the meta-transactional exchange, remote procedural calls (RPC) connection details and a connection of the first wallet address to the first blockchain; (c) determining, by the meta-transactional exchange from the first transaction request, the first amount of a transaction fee ("gas"), comprising at least: (1) obtaining, by an analytics module, the current price of the first native token of the first blockchain; (2) obtaining, by an analytics module, the suggested gas fee based on the first smart contract of the first blockchain; (3) processing, by an analytics module, the mathematical and statistical minima for eliminating the risk of losing the first native token to "out-of-gas" errors on the first blockchain; (d) receiving, by the meta-transactional exchange from a merchant processor module, a payment in fiat from the first user, comprising: (1) transmitting, by a merchant services provider from the device of the first user, a payment of the first amount in fiat; (2) receiving, by the meta-transactional exchange from the third-party module of the merchant service provider, a signal that a payment of the first amount was rendered by the first user; (e) transmitting, by the meta-transactional exchange, a first transfer of the first amount from the reserve to the first wallet address; (f) determining, by the meta-transactional exchange, the first wallet address received the first amount; (g) processing, by the meta-transactional exchange, the preparation of the first meta-transaction of the first transaction request; (h) transmitting, by the meta-transactional exchange, the execution of the first meta-transaction comprising: (1) transmitting, by the first meta-transaction, the second amount from the first wallet address to the first blockchain; (2) transmitting, by the first meta-transaction, the first instruction of the first meta-transaction to the first blockchain; (i) determining, by the meta-transactional exchange, the completion status of the first meta-transaction; (j) processing, by the meta-transactional exchange, the removal of the first transaction request from the processing queue; (k) obtaining, by the meta-transactional exchange, the difference of the first amount and second amount as an accrual of current balances of the first wallet.

2. The system of claim 1, wherein the multi-blockchain smart contract management system includes an inbound oracle.

3. The system of claim 1, wherein the at least first smart contract includes at least one of a standardized (fungible token, non-fungible token, etc.) and custom smart contract.

4. The system of claim 3, wherein the custom smart contract includes an oracle.

5. The system of claim 4, wherein the outbound oracle transmission includes targeting a selection of blockchains including at least the on-chain host of the smart contract.

6. The system of claim 5, wherein the selection of blockchains includes decentralized computing blockchain networks with at least one smart contract.

7. The system of claim 5, wherein the outbound oracle transmission includes at least one of a transfer or invocation of a function of a smart contract.

* * * * *